(12) United States Patent
Conlon et al.

(10) Patent No.: US 8,000,865 B2
(45) Date of Patent: Aug. 16, 2011

(54) METHOD AND APPARATUS FOR TRANSITIONING AN ELECTRICALLY VARIABLE TRANSMISSION

(75) Inventors: Brendan M. Conlon, Rochester Hills, MI (US); Jy Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 746 days.

(21) Appl. No.: 12/115,769

(22) Filed: May 6, 2008

(65) Prior Publication Data

US 2009/0281694 A1 Nov. 12, 2009

(51) Int. Cl.
*G06F 19/00* (2006.01)
(52) U.S. Cl. ............... 701/51; 701/70; 475/5; 475/116; 180/65.21; 180/65.275; 180/338
(58) Field of Classification Search ............... 701/51, 701/70; 475/5, 31, 116; 180/65.21, 65.275, 180/65.1, 337, 338; 903/911; *G06F 19/00*
See application file for complete search history.

(56) References Cited

U.S. PATENT DOCUMENTS

| 7,481,733 | B2 * | 1/2009 | Cho et al. ............... 475/5 |
| 7,517,296 | B2 * | 4/2009 | Foster et al. ............... 475/161 |
| 7,610,137 | B2 * | 10/2009 | Kwon ............... 701/51 |
| 7,769,515 | B2 * | 8/2010 | Lee ............... 701/51 |
| 2005/0080535 | A1 * | 4/2005 | Steinmetz et al. ............... 701/51 |
| 2006/0289212 | A1 * | 12/2006 | Haruhisa ............... 180/65.2 |
| 2007/0117671 | A1 * | 5/2007 | Long et al. ............... 475/116 |
| 2007/0151781 | A1 * | 7/2007 | Kuang et al. ............... 180/65.1 |
| 2007/0179004 | A1 * | 8/2007 | Endo ............... 475/116 |
| 2007/0221432 | A1 * | 9/2007 | Fournier et al. ............... 180/337 |

(Continued)

FOREIGN PATENT DOCUMENTS

JP 2006183682 A * 7/2006

(Continued)

OTHER PUBLICATIONS

Jeongmin Kim, Namdoo Kim, Sungtae Cho, Hyunsoo Kim; "Motor-Generator Control of an Electro-mechanical Variable Transmission for a Hybrid Electric Vehicle"; Digital Object Identifier: 10.1109/SICE.2006.315113; Publication Year: 2006 , pp. 2420-2423.*

(Continued)

*Primary Examiner* — Tuan C To
(74) *Attorney, Agent, or Firm* — Quinn Law Group, PLLC (57) ABSTRACT

A method is provided for transitioning from an initial to a final transmission mode in an electrically variable transmission (EVT), and includes transitioning to an intermediate mode having an additional speed degree of freedom (DOF), changing a transmission ratio, and engaging a clutch to shift to the final mode. The modes include input and compound split, fixed gear ratio, and electric torque converter (ETC), with and without input from an engine. Output torque is maintained by adjusting a charge on an energy storage device. A brake grounds an input member of the EVT. The EVT has the input member, an output member, a stationary member, and first and second motor/generators. An algorithm transitions between modes by releasing at least one clutch to transition to a mode having an extra speed degree of freedom (DOF), and utilizing the extra speed DOF to change the ratio of the EVT.

15 Claims, 4 Drawing Sheets

U.S. PATENT DOCUMENTS

2008/0176706 A1 * 7/2008 Wu et al. .......................... 477/5
2009/0156345 A1 * 6/2009 Ishimori et al. ............... 475/116
2009/0275439 A1 * 11/2009 Kersting .......................... 475/5

FOREIGN PATENT DOCUMENTS

| | | | |
|---|---|---|---|
| JP | 2006335294 A | * | 12/2006 |
| JP | 2007168679 A | * | 7/2007 |

OTHER PUBLICATIONS

Szumanowski, A., Yuhua, C., Piorkowski, P.; "Analysis of different control strategies and operating modes of compact high planetary transmission drive"; Digital Object Identifier: 10.1109/VPPC.2005. 1554631; Publication Year: 2005.*

* cited by examiner

Fig-1

| C5 | C4 | C3 | C2 | C1 | Transmission Mode | Speed DOF |
|----|----|----|----|----|-------------------|-----------|
| O | O | O | O | O | Neutral | 4 |
| O | O | X | O | X | EVT1 Input Split | 2 |
| O | X | X | O | X | FG1 | 1 |
| O | X | O | O | X | EVT2 Compound Split | 2 |
| O | X | O | X | X | FG2 | 1 |
| O | X | O | X | O | EVT3 Compound Split | 2 |
| O | X | X | X | O | FG3 | 1 |
| O | O | X | X | O | EVT4 Input Split | 2 |
| O | O | O | O | X | ETC Mode 1 | 3 |
| O | O | O | X | O | ETC Mode 2 | 3 |
| X | O | X | O | X | EVT 1 Input Split with Engine Off | 1 |
| X | X | O | O | X | EVT Compound Split with Engine Off | 1 |
| X | X | O | X | O | EVT 3 Compound Split with Engine Off | 1 |
| X | O | X | X | O | EVT4 Input Split with Engine off | 1 |
| X | O | O | O | X | ETC Mode 1 with Engine Off | 2 |
| X | O | O | X | O | ETC Mode 2 with Engine Off | 2 |

METHOD AND APPARATUS FOR TRANSITIONING AN ELECTRICALLY VARIABLE TRANSMISSION

TECHNICAL FIELD

The invention relates to a control strategy or method and an apparatus for transitioning between different operating states or modes of an electrically variable transmission (EVT).

BACKGROUND OF THE INVENTION

An electrically variable transmission (EVT) typically has an input member connected to an engine, as well as one or two motor/generators that are each selectively connected to different members of multiple gear sets to enable one or more transmission operating modes. The transmission operating modes may include various EVT modes, such as input, output, and/or compound split modes, fixed speed ratio modes, and electric-only (battery powered) or EV modes. An EVT mode is an operating mode in which the speed ratio between an input and an output member of the transmission is determined by the speed of one or both of the motor/generators.

An EVT may improve vehicle fuel economy in a variety of ways. For instance, the engine may be turned off at idle, during periods of deceleration and braking, and during periods of relatively low speed or light vehicle load operation to thereby eliminate efficiency losses incurred due to engine drag. Captured braking energy via regenerative braking, or energy stored by one of the motor/generators acting in its capacity as a generator during periods when the engine is operating, is utilized during these "engine off" periods to extend the period or duration during which the engine is off, to supplement engine torque or power, to operate the vehicle at a lower engine speed, and/or to supplement accessory power supplies. Transient demand for engine torque or power is supplemented by the motor/generators during "engine on" periods, allowing for downsizing of the engine without reducing apparent vehicle performance. Additionally, the motor/generators are efficient in accessory power generation, and electric power from the battery serves as an available power reserve allowing operation at a relatively low transmission speed ratio.

Electrically-variable operating modes may be classified as input-split, output-split, compound-split, or series modes. Input-split modes have one motor/generator geared such that its speed varies in direct proportion to the transmission output, and have the other motor/generator geared such that its speed is a linear combination of the input and output member speeds. Output-split modes have one motor/generator geared such that its speed varies in direct proportion to the transmission input member, and have the other motor/generator geared such that its speed is a linear combination of the input member and the output member speeds. A compound-split mode has both motor/generators geared such that their speeds are linear combinations of the input and output member speeds, but neither is in direct proportion to either the speed of the input member or the speed of the output member. A series mode has one motor/generator geared such that its speed varies in direct proportion to the speed of the transmission input member, and another motor/generator geared such that its speed varies in direct proportion to the speed of the transmission output member. There is no direct mechanical power transmission path between the input and output members when operating in series mode, and therefore all power must be transmitted electrically.

In each of the four types of electrically-variable operating modes, or EVT modes, the speeds of the motors are linear combinations of the input and output speeds. Thus, these modes have two speed degrees of freedom, abbreviated hereinafter for simplicity as DOF. Mathematically, the speed and torque equations of these class of modes take the form:

$$\begin{bmatrix} T_a \\ T_b \end{bmatrix} = \begin{bmatrix} a_{1,1} & a_{1,2} \\ a_{2,1} & a_{2,2} \end{bmatrix} \begin{bmatrix} T_i \\ T_o \end{bmatrix} \text{ and } \begin{bmatrix} N_a \\ N_b \end{bmatrix} = \begin{bmatrix} b_{1,1} & b_{1,2} \\ b_{2,1} & b_{2,2} \end{bmatrix} \begin{bmatrix} N_i \\ N_o \end{bmatrix}$$

where a and b are coefficients determined by the transmission gearing. The type of EVT mode can be determined from the structure of the matrix of B coefficients. That is, if $b_{2,1}=b_{1,2}=0$ or $b_{1,1}=b_{2,2}=0$, the mode is a series mode. If $b_{1,1}=0$ or $b_{1,2}=0$, the mode is an input split mode. If $b_{2,1}=0$ or $b_{2,2}=0$, the mode is an output split mode. If each of $b_{1,1}$, $b_{1,2}$, $b_{2,1}$, and $b_{2,2}$ are nonzero, the mode is a compound split mode.

An EVT may also contain one or more fixed gear modes. In general these modes result from closing one additional clutch than the number required to select an electrically-variable mode. In these modes, the speed of the input and each motor are proportional to the speed of the output. Thus, these modes have only one speed DOF. Mathematically, the speed and torque equations of these class of modes take the form:

$$[T_b] = \begin{bmatrix} a_{1,1} & a_{1,2} & a_{1,3} \end{bmatrix} \begin{bmatrix} T_a \\ T_i \\ T_o \end{bmatrix} \text{ and } \begin{bmatrix} N_a \\ N_b \\ N_i \end{bmatrix} = \begin{bmatrix} b_{1,1} & b_{1,2} & b_{1,3} \end{bmatrix} [N_o]$$

where a and b are coefficients determined by the transmission gearing. If $b_{1,1}$ is nonzero, motor A can contribute to output torque during operation in the fixed gear mode. If $b_{1,2}$ is nonzero, motor B can contribute to output torque during operation in the fixed gear mode. If $b_{1,3}$ is nonzero, the engine can contribute to output torque during operation in the fixed gear mode. If $b_{1,3}$ is zero, the mode is an electric-only fixed gear mode.

An EVT may also contain one or more modes with three speed DOF. These modes may or may not include reaction torque sources such that the transmission is capable of producing output torque proportional to engine torque or motor torque. If a mode with three speed DOF is capable of producing output torque, the torques of the engine and any motor connected as a reaction to the engine torque will generally be proportional to the output torque. If a motor is not connected as a reaction to the engine torque, its torque can be commanded to control its speed independently of the transmission input and output speed.

In a mode with three speed DOF, it is generally not possible to easily control battery power independently of output torque. This type of mode produces an output torque which is proportional to each of the reacting torque sources in the system. The fraction of total output power provided by each of the three torque sources may be adjusted by varying the speeds of the motors and input. These modes are hereafter referred to as electric torque converter (ETC) modes in recognition of the fact that power flows to or from the ESD as a function of the output torque and the speed of the engine, output, and one of the motors. Mathematically, the speed and torque equations of this class of modes take the form:

$$\begin{bmatrix} T_a \\ T_b \\ T_i \end{bmatrix} = [\, a_{1,1} \quad a_{1,2} \quad a_{1,3} \,][T_o] \text{ and } [N_b] = [\, b_{1,1} \quad b_{1,2} \quad b_{1,3} \,]\begin{bmatrix} N_a \\ N_i \\ N_o \end{bmatrix}$$

where a and b are coefficients determined by the transmission gearing.

If $a_{1,1}$ is nonzero, motor A serves as a reaction member and its torque is proportional to output torque when operating in the ETC mode. If $a_{1,1}$ is zero, motor A is disconnected and its torque is not determined by the output torque. If $a_{1,2}$ is nonzero, motor B serves as a reaction member and its torque is proportional to output torque when operating in the ETC mode. If $a_{1,2}$ is zero, motor B is disconnected and its torque is not determined by the output torque. If $a_{1,3}$ is nonzero, the engine can contribute to output torque during operation in the fixed gear mode. If $a_{1,3}$ is zero, the input is disconnected and its torque is not determined by the output torque. If all of $a_{1,1}$, $a_{1,2}$, and $a_{1,3}$ are zero, the mode is a neutral mode that is not capable of producing output torque.

Transmission ratios may be changed in an EVT using a synchronous shift or a clutch-to-clutch shift. In the former, EVT modes are used to change direction of or slew the speed of the engine while transitioning between two transmission ratios. Transitions between modes ordinarily go through intermediate fixed gear ratios forming the boundaries between the modes. In the latter, the EVT can shift directly between desired modes using slipping friction clutches. However, control strategies for executing shifts or transitions in an EVT may have a less than optimal shift time and/or shift efficiency.

SUMMARY OF THE INVENTION

Accordingly, a shift control strategy or method is provided for reducing shift time and improving shift efficiency in an electrically-variable transmission or EVT. The control strategy utilizes a plurality of torque-transmitting mechanisms or clutches to transition between various transmission operating modes while maintaining a constant engine speed if desired, and with a reduced disruption of output torque during shift events.

The method includes providing various transmission states or modes having one, two, or three speed degrees of freedom (DOF), depending on the number of clutches that are engaged. The number of speed DOF in a given transmission gear interconnection scheme is related to the number of fixed interconnections between nodes in the geartrain. In general, each additional fixed interconnection reduces the number of speed degrees of freedom by one. Since the closure of a clutch is equivalent to the addition of a fixed interconnection, the number of speed DOF is also related to the number of disengaged clutches. For example, it is possible to design a transmission with at least four clutches such that four disengaged clutches provide a neutral mode, three disengaged clutches provides three speed DOF corresponding to an electric torque converter (ETC) mode, two disengaged clutches provides two speed DOF corresponding to either an input split or a compound split mode, and one disengaged clutch provides one speed DOF corresponding to a fixed gear ratio mode. Alternately, another transmission may contain two clutches, where closure of both clutches results in a fixed gear mode, closure of one clutch results in a two speed DOF EVT mode, and closure of none of the clutches results in three speed DOF ETC mode.

According to the control methodology of the invention, an EVT is initially in a one speed DOF mode corresponding to a first, a second, or a third fixed gear ratio. The EVT may also be initially in a two speed DOF mode corresponding to one of the four types of EVT modes. The method then includes releasing either one or two of the engaged clutches, respectively, in order to place the EVT in an intermediate mode with one or more additional speed DOF mode. The extra degree of freedom or DOF enabled by the intermediate mode is then utilized to change the ratio of the transmission to a point where a second intermediate mode, or another one or two speed DOF mode, may be entered or transitioned to.

More particularly, the method includes shifting from a first to a second operating mode, with the second operating mode being an ETC mode having three speed DOF. The transmission ratio is changed to a predetermined ratio where a final two or one speed DOF mode may be synchronously engaged. The method then includes engaging one or two clutches to shift in either a synchronous or an asynchronous manner to the third operating mode. The first operating mode can be an EVT mode or a fixed gear ratio mode, and the third operating mode can be another EVT mode or another fixed gear mode. The method can also include shifting between different ETC modes, each having three speed DOF. Additionally, the method can include shifts where the starting and ending modes are one speed DOF fixed gear modes where the input is at zero speed, suitable for electric-only operation. In this case, the transitional or intermediate mode or modes have two speed DOF, since the engine is off and fixed at zero speed throughout the transition or shift. An input brake can be used to ground an input member of the EVT as needed.

A method is also provided for shifting an EVT having at least four torque transfer mechanisms providing a pair of input split modes, a pair of compound split modes, at least three gear ratio modes, and a pair of ETC modes. The method includes detecting a shift request in a first operating mode, transitioning to one of the pair of ETC modes in response to the shift request, changing a transmission ratio to a predetermined ratio, and synchronously or asynchronously engaging at least one torque transfer mechanism to transition to a second operating mode.

A powertrain is provided having an EVT that is controllable using the method described above. The powertrain includes an engine, an input member, an output member, a stationary member, first and second motor/generators, and three gear sets each having first, second, and third gear members. The powertrain includes four torque-transmitting mechanisms providing a plurality of transmission operating modes, including at least three fixed gear ratios, a pair of input split modes, a pair of compound split modes, and a pair of ETC modes. A controller has a shift control algorithm for selecting between the operating modes by releasing at least one of the torque-transmitting mechanisms to transition to one of the ETC modes having an extra speed DOF, and for using the extra speed DOF to change the ratio of the EVT.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Referring to the drawings, wherein like reference numbers refer to like components, and beginning with FIG. 1, a powertrain 10 derives propulsive energy or power from any or all of an engine 12, a first motor/generator 20 (also labeled M/G A), and a second motor/generator 22 (also labeled M/G B), as well as from an energy storage device or ESD 86, as will be explained below. The engine 12 has an output shaft or member that serves as an input member 16 of an electrically-variable transmission or EVT 14. The EVT 14 is designed to selectively receive a portion of its driving power from the engine 12 in a plurality of its various transmission states or operating modes, which include a pair of electric torque converter (ETC) modes described below, a pair of input split modes, a pair of compound split modes, and a plurality of fixed gear ratio modes, as will be discussed below with reference to FIG. 2. A final drive unit or assembly 17, abbreviated FD in FIG. 1 for simplicity, is operatively connected to an output shaft or output member 18 of the EVT 14. Although not shown in FIG. 1, the final drive assembly 17 may include a planetary gear set, one or more parallel shaft gear sets, a bevel or hypoid gear, and/or a chain transfer mechanism, as will be understood by those of ordinary skill in the art.

The EVT 14 includes a plurality of torque-transmitting mechanisms or clutches C1, C2, C3, C4, and C5, which may be configured either as rotating clutches or as braking clutches, depending on the particular application, as explained herein. The clutches 32, 34, and 36, labeled C1, C3, and C5, respectively, which are configured as braking clutches or brakes, and each of which are operable for selectively grounding a member of the powertrain 10 to a stationary member 84, such as a transmission housing, casing, or other stationary member of the powertrain 10. Rotating clutches 31 and 33 (C2 and C4, respectively) are operable for selectively connecting a member of one of at least three different gear sets 40, 50, and 60 with a member of a different one of the gear sets 40, 50, and 60, and/or with one of the motor/generators 20, 22, as described hereinbelow with reference to FIG. 2.

Figure 1:
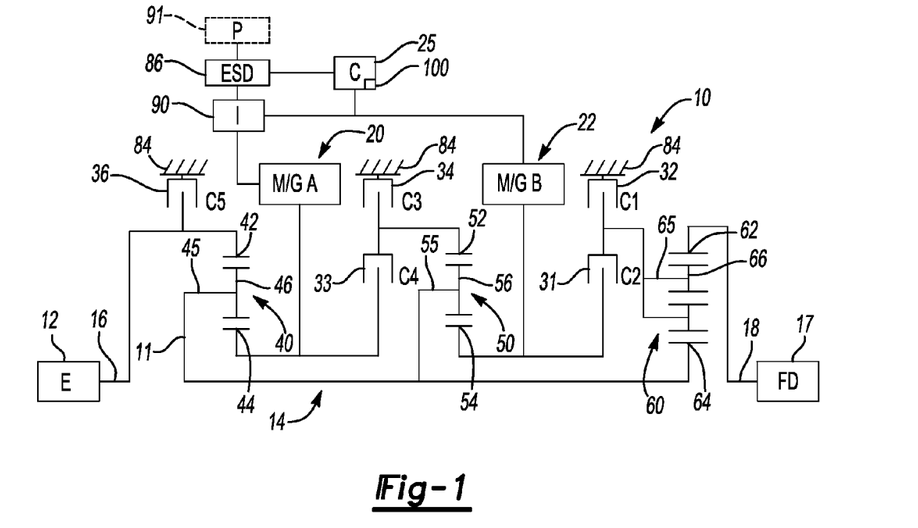
FIG. 1 is a stick diagram of powertrain having an electrically variable transmission or EVT that is usable with a shift control strategy or method of the invention.

In the exemplary embodiment of the powertrain 10 as shown in FIG. 1, the gear set 40 is a simple planetary gear set having an outer ring gear 42, an inner sun gear 44, and a plurality of pinion gears 46 rotatably supported by a carrier member 45. Likewise, the gear set 50 is configured as a simple planetary gear set having an outer ring gear 52, an inner sun gear 54, and a plurality of pinion gears 56 rotatably supported by a carrier member 55. The gear set 60 is configured as a compound planetary gear set and includes an outer ring gear 62, an inner sun gear 64, and a carrier member 65, with the carrier member 65 having a plurality of pinion gears 66, with the carrier member 65 being a double-pinion carrier as shown in the embodiment of FIG. 1, although a single-pinion carrier may also be used without departing from the intended scope of the present invention.

Therefore, the clutch 32 (C1) selectively connects the carrier member 65 of the third gear set 60 with the stationary member 84, the clutch 34 (C3) selectively connects the ring gear 52 of the second gear set 50 to the stationary member 84, and the clutch 36 (C5) selectively connects the ring gear 42 of the first gear set 40 to the stationary member 84. The clutch 31 (C2) selectively connects the sun gear 54 of the second gear set 50 to the carrier member 65 of the third gear set 60. Clutch 33 (C4) selectively connects the sun gear 44 of the first gear set 40 to the ring gear 52 of the second gear set 50. The output member 18 is continuously interconnected with the ring gear 62 of the third gear set 60 for common rotation therewith, and the ring gear 42 of the first gear set 40 is continuously interconnected with the input member 16 for common rotation therewith. The first motor/generator 20, or MG/A, is continuously connected to the sun gear 44 of the first gear set 40. The second motor/generator 22, or M/G B, is continuously connected to the sun gear member 54 of the second gear set 50, and is operable for transmitting torque to the output member 18, as will be discussed below.

The powertrain 10 may be further configured with an onboard energy storage device or ESD 86 that is operatively connected to each of the respective motor/generators 20, 22 such that motor/generators 20, 22 may selectively transfer power to or receive power from the ESD 86. As used herein, an "onboard" energy storage device is any energy storage device that is mounted on the vehicle (not shown) to which the powertrain 10 with the motor/generators 20 and 22 are also mounted. The ESD 86 may be, for example, one or more batteries or battery packs. Other onboard energy storage devices, such as fuel cells or capacitors, which have the ability to provide and/or to store and dispense sufficient electric power may be used in combination with or in place of batteries.

An electronic control unit or controller 25, abbreviated C in FIG. 1 for simplicity, is operatively connected to the ESD 86 to control the distribution of power to or from the ESD 86 as needed. Operating data gathered by various sensors (not shown), such as the speed of the input member 16 and the output member 18, may be provided to the controller 25 as well, for various uses, such as when operating in a regenerative braking mode. As will be understood by those of ordinary skill of the art, regenerative braking capability may be accomplished by using the controller 25 as needed to balance input torque from the engine 12, from the motor/generator 20 (M/G A), and/or from the motor/generator 22 (M/G B) during braking in order to provide a desired rate of deceleration of the output member 18, and/or one or more individual braking units (not shown).

The ESD 86 may be connected to a DC-to-AC power inverter 90, labeled "I" in FIG. 1 for simplicity, and may also be configured for recharging via an offboard power supply system 91 when used with a plug-in style hybrid powertrain design. As used herein, an "offboard" power supply is a power supply that is not mounted on a vehicle having a powertrain 10, is not integral with the EVT 14, and is operatively connected to the ESD 86 only during periods of recharging. Different offboard power supply systems that establish connectivity between the ESD 86 and an offboard power supply system 91 for recharging of the ESD 86 are shown and described with respect to FIGS. 3A, 3B, and 3C, as described below.

Figure 2:
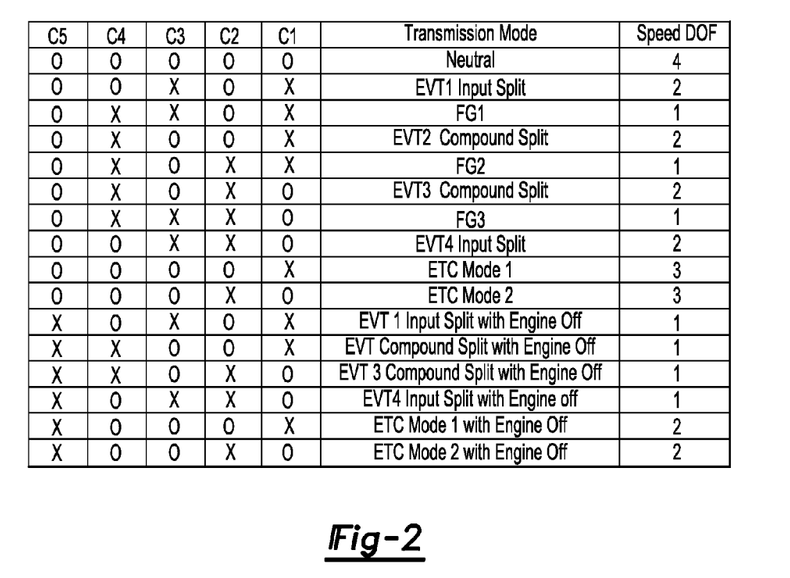
FIG. 2 is a truth table for the transmission shown in FIG. 1.

Referring to FIG. 2, a table describes the various operating modes of the powertrain 10 of FIG. 1. Note that each successive application of a clutch or brake (C1-C5) decreases the number of speed degrees of freedom (DOF) by one. Fixed gear modes with one speed DOF allow only one independent speed node, and all other speed nodes are linearly dependent. For example, in a fixed gear mode, represented as FG1, FG2, or FG3 in FIG. 2, all speed nodes including the input are proportional to the output speed of the EVT 14. EVT modes with two speed DOF allow two independent speed nodes. In FIG. 2, the EVT modes include two input split modes (EVT1 and EVT4) and two compound split modes (EVT2 and EVT3). For example, in an EVT mode, all speed nodes other than the input and output speed can be calculated as a linear combination of the input and output speeds. For one and two DOF modes, it is possible to choose motor torques such that the battery power is zero for a given engine torque.

Within the scope of the invention, it is possible to be in multiple EVT modes (i.e., EVT1, EVT2, EVT3, or EVT4) for a given transmission ratio. During operation of the EVT 14, it may be desirable to transition between two different EVT modes while maintaining a constant engine speed in order to provide an optimal vehicle feel, i.e., a "feel" that is perceived by the driver as sufficiently "smooth".

In an Electric Torque Converter (ETC) mode having three speed DOF, that is, when the engine 12 (see FIG. 1) is operating and the input member 16 is not otherwise grounded via the clutch 36 (C5), there is an extra degree of freedom provided beyond the two degrees of freedom of the input and output speeds. In these two ETC modes, there may not be the flexibility to choose motor torques such that battery power is effectively zero for any given engine torque. The EVT 14 (see FIG. 1) therefore may be transitioned or shifted to two ETC modes, i.e., the ETC mode 1 and the ETC Mode 2. In the ETC Mode 1, the motor/generator 22 (M/G B) is decoupled from the EVT 14, so that its speed may be independently controlled. Torque from the motor/generator 20 (M/G A of FIG. 1) is proportional to output torque, and its speed is a linear combination of the input and output speeds. In the ETC Mode 2, the speed of the motor/generator 20 (M/G A) of FIG. 1 is a linear combination of input speed, output speed, and the speed of the motor/generator 22 (M/G B). The torques of each of motor/generators 20 and 22 (M/G A and M/G B, respectively) are proportional to output torque.

Still referring to FIG. 2, when the clutch 36 (C5) of FIG. 1 (that is, the input brake) is engaged or applied, the input member 16 from the engine 12 is grounded. The engine 12 is therefore turned off, and the EVT 14 operates in a number of electric-only modes. In this instance, the four EVT modes, i.e., EVT 1 (Input Split), EVT 2 (Compound Split), EVT 3 (Compound Split), and EVT 4 (Input Split) enjoy a single speed DOF, versus the two speed DOF enabled when the clutch 36 (C5) is not engaged, as discussed above. Regardless of whether the clutch 36 (C5) is engaged or not, one or more transitional or intermediate transmission modes are provided by the ETC Modes 1 and 2, with these intermediate transmission modes providing an extra or additional speed DOF relative to the initial transmission mode from which the EVT 14 is being transitioned or shifted. When the clutch 36 (C5) is applied or engaged, the ETC Modes 1 and 2 have two speed DOF. When the clutch 36 (C5) is released, the ETC Modes 1 and 2 have three speed DOF. The use of the additional speed DOF to complete the transition or shift will be described in more detail below with reference to FIGS. 4-9.

Figure 3A:
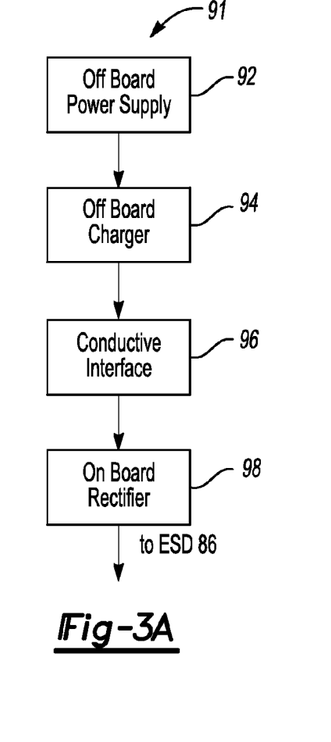
FIG. 3A is a schematic illustration of an offboard power supply usable with the powertrain of FIG. 1.

Referring to FIG. 3A, the offboard power supply system 91 described above with reference to FIG. 1 includes an offboard power supply 92 and an offboard charger 94 operatively connected with the offboard power supply 92, both of which are offboard of (i.e., not mounted onboard of) a vehicle having any of the transmission embodiments described herein. Instead, an onboard/offboard conductive interface 96, such as an electrical outlet and plug, permits selective connection of the offboard components (the offboard power supply 92 and offboard charger 94) with the onboard ESD 86, optionally through an onboard rectifier 98 that is necessary only if the charger 94 supplies alternating current. The transmission embodiments described herein that utilize such an offboard power supply system 91 may be referred to as plug-in hybrid transmissions, as described hereinabove. The charger 94 is an offboard conductive-type charger that regulates the flow of electrical power from the offboard power supply 92 to ESD 86. When ESD 86 is sufficiently recharged, the connection through interface 96 is terminated, and the recharged ESD 86 is then used as discussed herein to power the motor/generators 20, 22, such as in an electric-only mode.

Figure 3B:
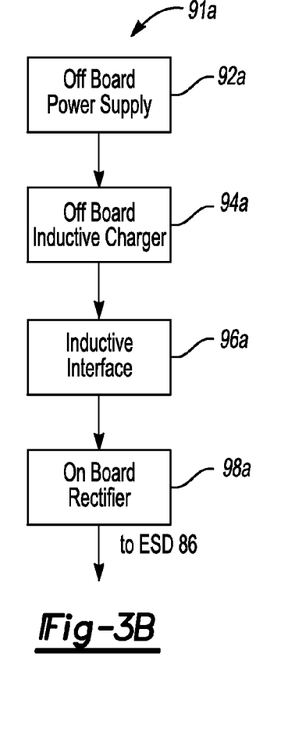
FIG. 3B is a schematic illustration of another offboard power supply usable with the powertrain of FIG. 1.

Referring to FIG. 3B, an alternate offboard power supply system 91a is illustrated using an offboard inductive-type charger 94a to regulate the flow of power from an offboard power supply 92a, through an onboard/offboard inductive interface 96a, to ESD 86. Power flow from the inductive interface 96a is optionally through an onboard rectifier 98a, which is required if the charger 94a provides alternating current. The offboard inductive charger 94a may be an electrical coil that establishes a magnetic field when powered by the offboard power supply 92a. The inductive interface 96a may be a complementary coil that connects the offboard components (offboard power supply 92a and offboard inductive charger 94a) with the onboard components (onboard rectifier 98a and the ESD 86) when positioned close enough to the offboard inductive charger 94a during recharging to allow a magnetic field generated by electrical power flowing in the inductive charger 94a to cause electrical power to flow to the onboard rectifier 98a and then to the ESD 86. When the ESD 86 is sufficiently recharged, the inductive interface 96a is no longer positioned near the offboard inductive charger 94a, and the recharged ESD 86 is then used as discussed herein to power the motor/generators 20, 22, such as in the electric-only mode.

Figure 3C:
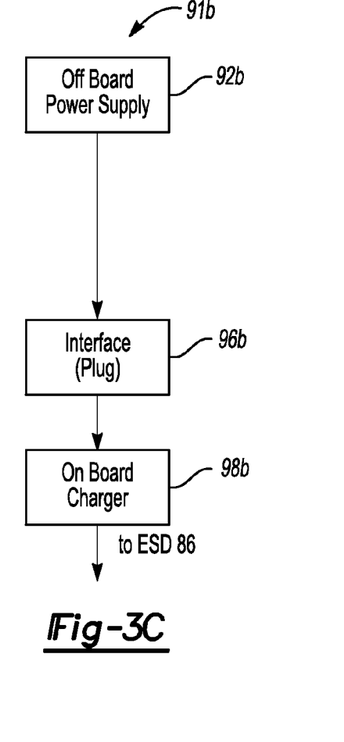
FIG. 3C is a schematic illustration of another offboard power supply usable with the powertrain of FIG. 1.

Referring to FIG. 3C, an alternate offboard power supply system 91b is illustrated using an offboard power supply 92b and an onboard charger 98b, as well as an interface 96b, such as an electrical outlet or plug, that permits selective connection of the offboard component (the offboard power supply 92b) with onboard charger 98b. The onboard charger 98b is connectable with an onboard ESD 86 (see FIGS. 2, 5a, and 5b). The transmission embodiments described herein that utilize such an offboard power supply system 91b may be referred to as plug-in hybrid transmissions. The charger 98B is an onboard conductive-type charger that regulates the flow of electrical power from offboard power supply 92b to ESD 86. When ESD 86 is sufficiently recharged, the connection through interface 96b is terminated, and the recharged ESD 86 is then used as discussed herein to power the motor/generators 20, 22, such as in an electric-only mode.

Referring to FIGS. 1 and 3 together, the EVT 14 is placed in neutral (four speed DOF) when the clutches 32, 31, 34, and 33 (C1-C4, respectively) are released or otherwise disengaged. In this mode, power flow is interrupted to the final drive 17 from the engine 12, the ESD 86, and both motor/ generators 20, 22 (M/G A and M/G B, respectively). To provide an input split mode, which corresponds to either of EVT1 and EVT4 modes, only two clutches are engaged. In particular, for EVT1, the clutches 32 (C1) and 34 (C3) are engaged, while for EVT4, the clutches 31 (C2) and 34 (C3) are engaged. Likewise, to provide a compound split mode, or EVT 2 and EVT3, two clutches are also engaged, with the clutches 32 (C1) and 33 (C4) being engaged for EVT2, and the clutches 31 (C2) and 33 (C4) being engaged for EVT3.

To place the EVT 14 into one of the three fixed gear ratios FG1, FG2, or FG3, that is, to enable one speed DOF, three clutches are engaged. For FG1, the three clutches are 32 (C1), 34 (C3), and 33 (C4). For FG2, the clutches are 32 (C1), 31 (C2), and 33 (C4). For FG3, the clutches are 31 (C2), 34 (C3), and 33 (C4). Finally, to place the EVT 14 in one of the two ETC modes, with three speed DOF, only one clutch is engaged. For ETC Mode 1, this is the clutch 32 (C1). For ETC Mode 2, this is the clutch 31 (C2).

Figure 4:
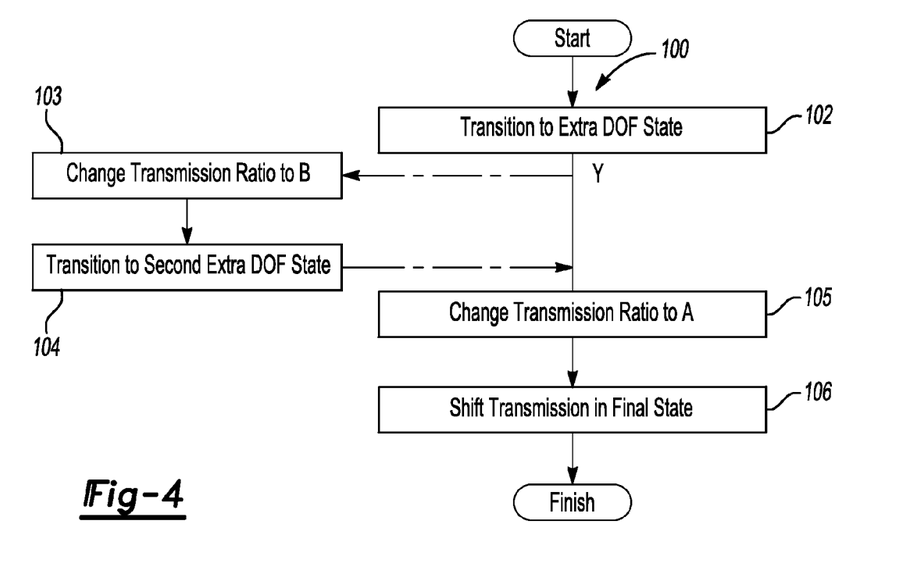
FIG. 4 is a flow chart describing an overall shift control strategy for use with the powertrain shown in FIG. 1.

Referring to FIG. 4, the algorithm 100 resident in the controller 25 of FIG. 1 provides an EVT shift or transitioning control strategy for changing ratios within the EVT 14 of FIG. 1 using an extra speed degree of freedom (DOF). The algorithm 100 begins at step 102, with the EVT 14 in a one or a 2 speed DOF mode (see FIG. 3). The algorithm 100 transitions to a speed DOF mode that is one greater than the initial transmission mode by releasing one or two of the clutches (C1-C4) as required per FIG. 2, so that only one clutch (C1-4) is engaged. That is, if in an initial one speed DOF mode, the algorithm 100 will enter a two speed DOF mode, and if initially in a two speed DOF mode, the algorithm 100 will enter a three speed DOF mode. The algorithm 100 then proceeds to step 104 in one embodiment, and to step 103 in another embodiment.

At step 103, shown in phantom in FIG. 4, the algorithm 100 includes utilizing the extra speed DOF in order to change the transmission ratio to a predetermined ratio (B), where a second extra speed DOF mode may be synchronously engaged by engagement of one clutch and the disengagement of another, according to FIG. 2. During the transition, the algorithm 100 maintains a sufficient level of output torque by either discharging or charging the ESD 86 (see FIG. 1), as needed. The algorithm 100 then proceeds to step 104.

At step 104, the algorithm 100 transitions to a second extra speed DOF mode by synchronously engaging one clutch and disengaging another clutch. During the transition, an acceptable level of output torque should be maintained by discharging or charging the ESD 86 (see FIG. 1) as required. The algorithm 100 then proceeds to step 105.

At step 105, the algorithm 100 utilizes the extra speed DOF in order to change the transmission ratio to a predetermined ratio (A) where the desired final one speed DOF or two speed DOF mode may be synchronously engaged by engaging one or two clutches, respectively. During the transition, the algorithm 100 maintains a sufficient level of output torque by either discharging or charging the ESD 86 (see FIG. 1), as needed. The algorithm 100 then proceeds to step 106.

At step 106, the algorithm 100 shifts the EVT 14 (see FIG. 1) to a desired final transmission mode. This is achieved by engaging one or two clutches as required, thus locking the EVT 14 into the desired operating mode or transmission mode as described in FIG. 2. As will be described next with references to FIGS. 5-7, various exemplary shift maneuvers may be executed in accordance with the algorithm 100, with the various steps being dependent upon the initial mode or mode of the EVT 14, and the desired end mode or mode.

Figure 5:
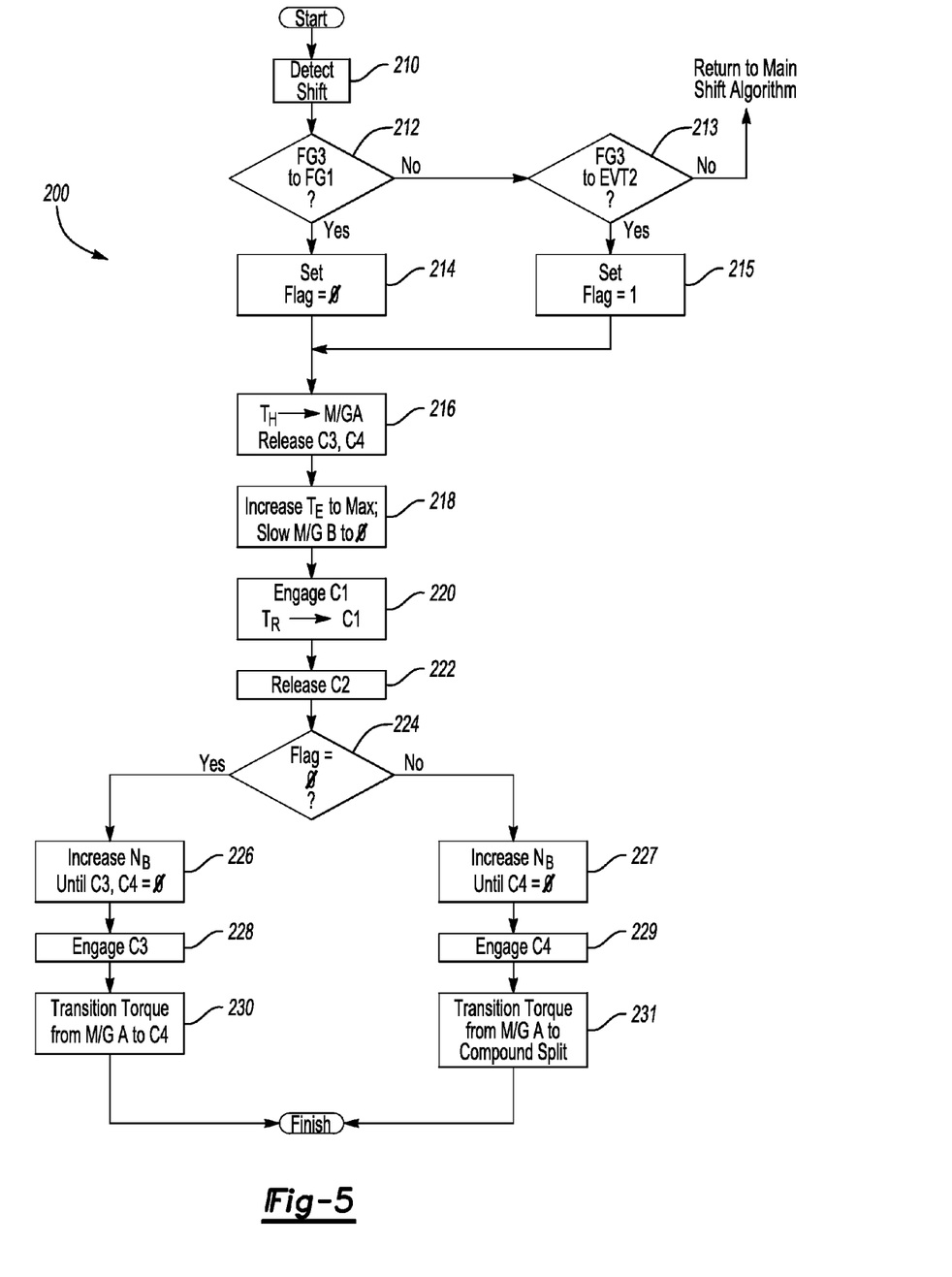
FIG. 5 is a flow chart describing a pair of exemplary downshift events from a fixed gear ratio mode to another operating mode.

Referring to FIG. 5, a representative or exemplary algorithm or method 200 of using the algorithm 100 of FIG. 4 as described above provides a downshift from one fixed gear ratio to another fixed gear ratio, here FG3 to FG1, and from a fixed gear ratio to an EVT mode, here FG3 to EVT2. However, those of ordinary skill in the art will recognize that other downshift events may be executed within the scope of the invention.

Beginning with step 210, the method 200 includes detecting, measuring, or otherwise determining the presence of a signal corresponding to a commanded shift event from one operating mode to another, or from one fixed gear ratio to another. If the presence of such a commanded shift event is detected, the method 200 proceeds to step 212. Otherwise, the method 200 exits to a main shift algorithm (not shown) which is adapted for controlling other shift events that do not fall within the scope of the invention.

At step 212, the method 200 includes determining whether the detected shift event (see step 210) corresponds to a downshift from one fixed gear ratio, such as FG3, to another fixed gear ratio, such as FG1. If so, the method 200 proceeds to step 214. Otherwise, the method 200 proceeds to step 213.

At step 213, the method 200 includes determining whether the detected shift event (see step 210) corresponds to a downshift from one fixed gear ratio, such as FG3, to an EVT mode, such as EVT2. If so, the method 200 proceeds to step 215. Otherwise, the method 200 exits to a main shift algorithm (not shown) discussed above at step 210.

At step 214, a flag is set corresponding to the detected shift event, such as by setting a flag to an integer value of zero, represented in FIG. 5 as Flag=0. The method 200 then proceeds to step 216.

At step 215, a flag is set corresponding to the detected shift event, such as by setting a flag to an integer value of one, represented in FIG. 5 as Flag=1. The method 200 then proceeds to step 216.

At step 216, the method 200 includes transitioning a holding torque, represented in FIG. 5 as $T_H$, as that term will be understood by those of ordinary skill in the art, to the motor/generator 20 (M/G A) (see FIG. 1). The clutches 33 (C4) and 34 (C3) are released simultaneously. The method 200 then proceeds to step 218.

At step 218, the torque (Te) from the engine 12 (see FIG. 1) is increased to a maximum value (Max) while slewing or changing the speed of the motor/generator 22 (M/G B) of FIG. 1 to approximately zero. Simultaneously, if the flag is equal to 1 at step 215, the speed of motor/generator 20 (M/G A) is slewed at a positive rate so that engine speed follows the desired trajectory to end up in EVT2. The method 200 then proceeds to step 220.

At step 220, the clutch 32 (C1) is engaged, and reaction torque ($T_R$) is transitioned from motor/generator 22 (M/G B) to the clutch 32 (C1). The method 200 then proceeds to step 222.

At step 222, the clutch 31 (C2) is released or disengaged, and the method 200 proceeds to step 224.

At step 224, the method 200 determines the status or setting of the flag (see steps 214 and 215). If the flag has a value corresponding to a fixed gear ratio downshift, the method 200 proceeds to step 226. Otherwise, the method 200 proceeds to step 227.

At step 226, the speed of motor/generator 22 (M/G B), represented as $N_B$ in FIG. 5, is increased until the speeds across clutches 33 (C4) and 34 (C3) are equal to zero. The method 200 then proceeds to step 228, wherein the clutches 34 (C3) and 33 (C4) are engaged. The method 200 then proceeds to step 230.

At step 227, the method 200 increases the speed of motor/generator 22 (M/G B), or $N_B$, until the speed across the clutch 33 (C4) is equal to zero. Alternately, the clutch 33 (C4) can be partially or asynchronously applied while slipping in order to reduce battery power demand and/or reduce the time required for accelerating the motor/generator 22 (M/G B). The method 200 then proceeds to step 229, wherein the clutch 33 (C4) is engaged. The method 200 then proceeds to step 231.

At step 230, reaction torque ($T_R$) is transferred from the motor/generator 20 (M/G A) to clutch 33 (C4). At this point, execution of the method 200 results in the engagement of the clutches 32 (C1), 33 (C4), and 34 (C3), which establishes the fixed gear ratio FG1 (see FIG. 3). The powertrain 10 of FIG. 1 can then operate in FG1 until the controller 25 detects another commanded shift at step 210.

At step 231, the method 200 includes transitioning torque from the motor/generator 20 (M/G A) (see FIG. 1) to a compound split, i.e., with the torque distributed between the motor/generator 20 (M/G A) and motor/generator 22 (M/G B). At this point, execution of the method 200 results in the engagement of the clutches 32 (C1) and 33 (C4), which establishes the operating mode EVT2 (see FIG. 3). The powertrain 10 of FIG. 1 can then operate in EVT2 until the controller 25 and any larger shift algorithm resident therein detects a signal corresponding to a shift from EVT2 to another operating mode.

Figure 6:
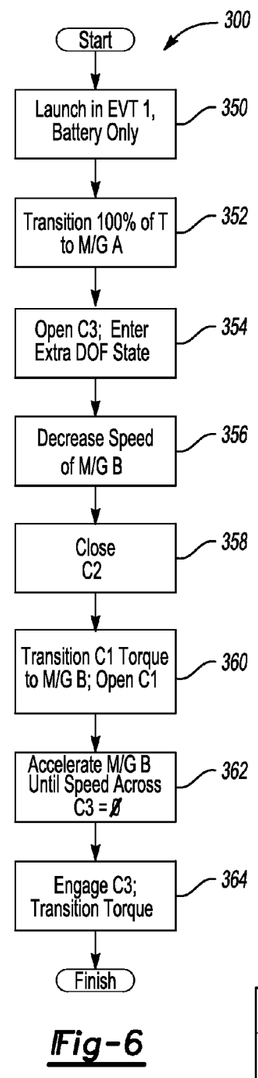
FIG. 6 is a flow chart describing an EVT mode-to-EVT mode shift event for the powertrain of FIG. 1 and the overall shift control strategy of FIG. 3.

Referring to FIG. 6, a representative or exemplary algorithm or method 300 of using the algorithm 100 of FIG. 4 as described above for starting the engine 12 (see FIG. 1) in an EVT mode, here EVT 1, and then shifting in a synchronous manner to another EVT mode such as EVT4 with the speed of the engine 12 at zero.

Beginning with step 350, the powertrain 10 (see FIG. 1) starts out in EVT1, i.e., with the clutches 32 (C1) and 34 (C3) closed or disengaged. The vehicle (not shown) having the powertrain 10 (see FIG. 1) is launched in EVT1 using the ESD 86 (see FIG. 1), that is, under battery power alone. In this mode, the clutch 36 (C5) (see FIG. 1) can be applied or engaged as an engine or input brake to hold the input speed at zero and provide sufficient reaction torque. Because the applied clutch 36 (C5) reduces the number of speed DOF by one, the EVT 14 enters a fixed gear mode with the engine 12 at a fixed ratio of zero. The method 300 then proceeds to step 352.

At step 352, the method 300 transitions all propulsion torque to the motor/generator 20 (M/G A). In other words, the torque on motor/generator 22 (M/G B) is zero. The method 300 then proceeds to step 354.

At step 354, the clutch 34 (C3) is released or disengaged, thus enabling an extra speed degree of freedom (DOF), or two speed DOF. The method 300 then proceeds to step 356.

At step 356, the method 300 includes decreasing the speed of the motor/generator 22 (M/G B) to zero. The method 300 then proceeds to step 358, where the clutch 31 (C2) is engaged or closed. Once the clutch 31 (C2) is fully engaged, the method 300 proceeds to step 360.

At step 360, the torque on the clutch 32 (C1) is transitioned to motor/generator 22 (M/G B), and then clutch 32 (C1) is disengaged or opened. The torques on motor/generators 20 and 22 (M/G A and M/G B, respectively) are controlled or set to a level that is proportional to a desired output torque. The method 300 then proceeds to step 362.

At step 362, the speed of motor/generator 22 (M/G B) is increased until the speed across the clutch 34 (C3) is approximately zero. At this point, the method 300 proceeds to step 364, wherein the clutch 34 (C3) is engaged. Upon engagement of the clutch 34 (C3), the method 300 includes transitioning torque to be shared between the motor/generators 20 and 22 (M/G A and M/G B, respectively).

Figure 7:
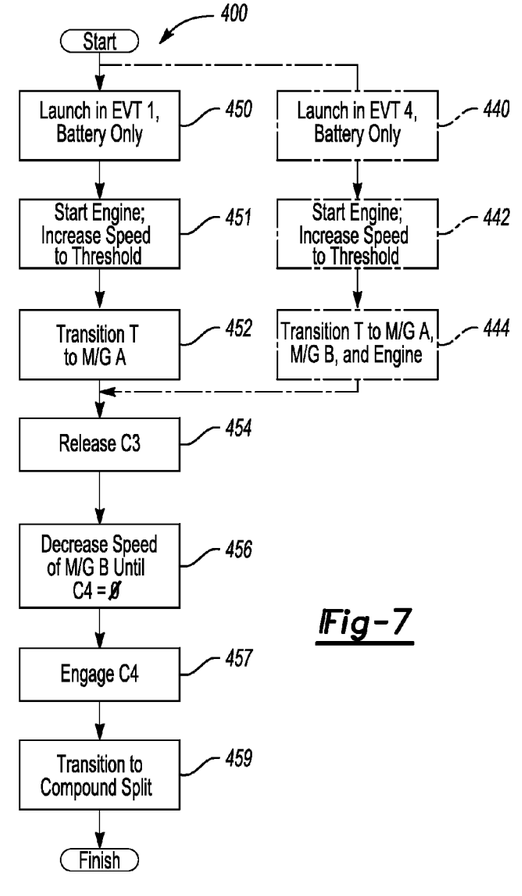
FIG. 7 is a flow chart describing another EVT mode-to-EVT mode shift event for the powertrain of FIG. 1 using the overall shift control strategy of FIG. 3.

Referring to FIG. 7, a representative or exemplary algorithm or method 400 of using the algorithm 100 of FIG. 4 as described above for starting the engine 12 (see FIG. 1) in an EVT mode, here EVT1 and, in phantom, EVT4, and then shifting to another EVT mode such as EVT2 without flaring the speed of the engine 12.

Beginning with step 440 shown in phantom, the powertrain 10 (see FIG. 1) starts out in EVT4, i.e., with the clutches 31 (C2) and 34 (C3) closed or engaged. The vehicle (not shown) having the powertrain 10 (see FIG. 1) is launched in EVT4 using the ESD 86 (see FIG. 1), that is, under battery power alone. Motor/generators 20 and 22 (M/G A and M/G B, respectively) share torque. The algorithm 400 proceeds to step 442.

At step 442, the method 400 includes starting the engine 12 (see FIG. 1). Once the engine 12 is started, engine speed is increased to a predetermined threshold speed, such as at least approximately 1000 revolutions per minute (rpm) in the embodiment shown in FIG. 7. At this point, the speed of the motor/generator 20 (M/G A) will be positive, with an input-to-output speed ratio greater than the ratio corresponding to FG3. The method 400 then proceeds to step 444.

At step 444, the clutch 34 (C3) is unloaded by transitioning torque to the motor/generators 20 and 22 (M/G A and M/G B, respectively) and the engine 12. The method 400 then proceeds to step 454.

At step 450, instead of starting out in EVT4 as explained above with reference to step 440, the powertrain 10 (see FIG. 1) starts out in EVT1, i.e., with the clutches 32 (C1) and 34 (C3) closed or engaged. The vehicle (not shown) having the powertrain 10 (see FIG. 1) is launched in EVT1 using the ESD 86 (see FIG. 1), that is, under battery power alone. Motor/generators 20 and 22 (M/G A and M/G B, respectively) share torque.

At step 451, the method 400 includes starting the engine 12 (see FIG. 1). Once the engine 12 is started, the method 400 includes increasing the engine speed to a predetermined threshold speed, such as at least approximately 1000 revolutions per minute (rpm) in the embodiment shown in FIG. 7. At this point, the speed of the motor/generator 20 (M/G A) will be positive, with an input-to-output speed ratio less than the ratio corresponding to FG1. The method 400 then proceeds to step 452.

At step 452, the method 300 transitions all torque necessary to react the engine 12 (see FIG. 1) to the motor/generator 20 (M/G A). In other words, the torque on motor/generator 22 (M/G B) is zero. The method 400 then proceeds to step 454.

At step 454, the clutch 34 (C3) is released or disengaged, then the method 400 proceeds to step 456, where the speed of the motor/generator 22 (M/G B) is decreased until the clutch 33 (C4) is approximately zero. The method 400 then proceeds to step 456.

At step 457, the method 400 includes engaging the clutch 33 (C4). Once step 457 is complete, the method 400 proceeds to step 459, wherein the powertrain 10 (see FIG. 1) is transitioned to a compound split mode, i.e., wherein the engine reaction torque is shared between the motor/generators 20 and 22 (M/G A and M/G B, respectively).

Figure 8:
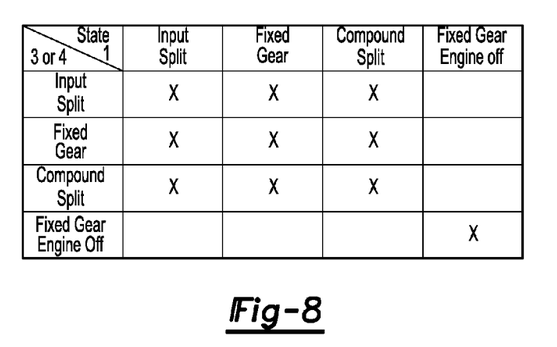
FIG. 8 is a truth table presenting exemplary mode transitions for the powertrain and EVT of FIG. 1.

Referring to FIG. 8, a truth table lists various exemplary EVT shifts or possible transitions of the EVT 14 of FIG. 1. The truth table of FIG. 8 corresponds to a transition from an initial transmission mode to a final transmission mode through one or two intermediate transmission modes. The initial transmission mode is represented in FIG. 8 as "1". The final transmission mode is represented alternately as "3" when a single intermediate transmission mode is used and "4" when two intermediate transmission modes are used. The initial and final transmission modes may be an input split mode, a fixed gear mode, a compound split mode, and a fixed gear mode with the engine 12 (see FIG. 1) off or grounded, as discussed above. Likewise, the EVT 14 having an engaged clutch 36 (C5) (see FIG. 1) can be transitioned between fixed gears with the engine 12 being off.

While the best modes for carrying out the invention have been described in detail, those familiar with the art to which this invention relates will recognize various alternative designs and embodiments for practicing the invention within the scope of the appended claims.

The invention claimed is:

1. A method for transitioning an electrically variable transmission (EVT) of a vehicle, the method comprising:
   releasing a clutch to thereby transition from an initial transmission mode having at least one speed degree of freedom (DOF) to at least one intermediate transmission mode, wherein the at least one intermediate transmission mode has one additional speed degree of freedom (DOF) relative to the initial transmission mode while still providing an output torque from the EVT;
   changing a transmission ratio of the EVT to a predetermined ratio after releasing the clutch, the predetermined ratio being sufficient for transitioning between the at least one intermediate transmission mode and a final transmission mode; and
   engaging another clutch to thereby transition the EVT from the at least one intermediate transmission mode to the final transmission mode.

2. The method of claim 1, wherein each of the initial and the final transmission mode provides one of an input split mode, a fixed gear mode, and a compound split mode.

3. The method of claim 1, wherein each of the at least one intermediate transmission modes has three speed DOF.

4. The method of claim 1, wherein the EVT is connected to an engine via an input member, and includes an input brake configured for grounding the input member, the method further comprising:
   engaging the input brake to thereby ground the input member;
   wherein the at least one intermediate transmission mode is an electric torque converter (ETC) mode having two speed DOF when the input brake is engaged.

5. The method of claim 1, including an engine, wherein the EVT is continuously connected to the engine;
   wherein the initial transmission mode is one a first input split mode having two speed DOF, a first fixed gear mode having one speed DOF, and a first compound split mode having two speed DOF;
   wherein the final transmission mode is one of a second input split mode having two speed DOF, a second fixed gear mode having one speed DOF, and a second compound split mode having two speed DOF; and
   wherein the at least one intermediate transmission mode is an electric torque converter (ETC) mode.

6. The method of claim 1, wherein the at least one intermediate transmission mode includes a first intermediate transmission mode and a second intermediate transmission mode.

7. The method of claim 1, wherein the EVT is electrically connected to an energy storage device (ESD); and
   wherein changing a transmission ratio of the EVT includes maintaining a sufficient level of output torque on an output member of the EVT by adjusting an electrical charge level of the ESD.

8. A method for transitioning between transmission modes in an electrically variable transmission (EVT), the method comprising:
   detecting a shift request while operating in an initial transmission mode having one or two speed DOF, the initial transmission mode being one of a first input split mode, a first compound split mode, and a first fixed gear ratio mode;
   transitioning from the initial transmission mode to at least one intermediate transmission mode in response to the shift request, wherein the at least one intermediate transmission mode has an additional speed DOF relative to the initial transmission mode, and is capable of producing an output torque;
   changing a transmission ratio of the EVT to a predetermined speed point; and
   transitioning the EVT from the at least one intermediate transmission mode to a final transmission mode, the final transmission mode being one of a second input split mode, a second compound split mode, and a second fixed gear mode.

9. The method of claim 7, wherein the EV is continuously connected to an engine, and wherein the at least one intermediate transmission mode includes a first and a second intermediate transmission mode each having three speed DOF, and each being capable of producing an output torque.

10. The method of claim 7, wherein the EVT includes an input brake for selectively grounding an input member of the EVT, the input member being continuously connected to an engine, the method further comprising:
    engaging the input brake to thereby reduce an input speed to the EVT to zero; and
    providing reaction torque to the EVT using the input brake;
    wherein engagement of the input brake and a clutch provides a pair of electric torque converter (ETC) modes each having two speed DOF, and each being capable of producing an output torque.

11. The method of claim 7, wherein transitioning between transmission modes is characterized by an absence of transitioning through a neutral mode and an absence of transitioning via an asynchronous shift.

12. An electrically variable transmission (EVT) comprising:
    an input member and an output member;
    a stationary member;
    a first, a second, and a third gear set each having respective first, second, and third members, wherein the first member of the third gear set is continuously connected with the output member;
    an interconnecting member connecting the second member of the first gear set, the second member of the second gear set, and the third member of the third gear set for common rotation;
    a first and a second motor/generator, wherein the first motor/generator is continuously connected with the third member of the first gear set and the second motor/generator is continuously connected with the third member of the second gear set;
    a first torque transmitting mechanism which is selectively engageable to connect the first motor/generator with the first member of the second gear set;
    a second torque transmitting mechanism which is selectively engageable to connect the second motor/generator with the third member of the third gear set;
    a third torque transmitting mechanism which is selectively engageable for connecting the second member of the third gear set to the stationary member;

a fourth torque transmitting mechanism which is selectively engageable for connecting the first member of the second gear set to the stationary member; and a controller having a shift control algorithm for transitioning from an initial transmission mode to a final transmission mode by releasing at least one of the first, second, third, and fourth torque transmitting mechanisms to thereby transition to at least one intermediate transmission mode;

wherein the at least one intermediate transmission mode has an additional speed degree of freedom (DOF) relative to the initial transmission mode, and wherein the controller utilizes the additional speed DOF to thereby change the ratio of the EVT.

13. The EVT of claim 12, wherein engagement of a different one of the first and the second torque-transmitting mechanisms establishes a different one of a pair of electric torque converter (ETC) modes.

14. The EVT of claim 12, further comprising an engine and an input brake, wherein the controller is adapted for selectively grounding the input member by applying the input brake to thereby establish an ETC mode capable of producing a torque while the engine is off.

15. The EVT of claim 12, wherein each of the initial and the final transmission modes provide one of an input split mode, a fixed gear mode, and a compound split mode.

* * * * *